(12) United States Patent
Tse et al.

(10) Patent No.: US 7,239,625 B1
(45) Date of Patent: Jul. 3, 2007

(54) LOW-COST NOISE-IMMUNE WIRELESS METHODOLOGY FOR DEMAND CONTROL VENTILATION (DCV) APPLICATIONS

(76) Inventors: Chi Wai Tse, 26B, Tower 5, Hong Kong Gold Coast, NT., Hong Kong (SAR) (HK); Jacob Y. Wong, 7110 Georgetown Rd., Goleta, CA (US) 93117

( * ) Notice: Subject to any disclaimer, the term of this patent is extended or adjusted under 35 U.S.C. 154(b) by 559 days.

(21) Appl. No.: 10/844,591

(22) Filed: May 11, 2004

Related U.S. Application Data

(60) Provisional application No. 60/470,041, filed on May 12, 2003.

(51) Int. Cl.
*H04J 3/24* (2006.01)
(52) U.S. Cl. .................. 370/349; 370/344; 340/539.22; 340/870.09; 375/303; 375/334; 700/276
(58) Field of Classification Search ........... 340/870.17, 340/870.09, 870.11–870.12, 539.16–539.17, 340/539.22, 539.26, 870.04, 874.16; 454/236; 370/349, 344, 298, 394; 375/303, 334; 700/276–280
See application file for complete search history.

(56) References Cited

U.S. PATENT DOCUMENTS

| 5,898,733 | A | * | 4/1999 | Satyanarayana | ............ 375/133 |
| 6,437,692 | B1 | * | 8/2002 | Petite et al. | ................ 340/540 |
| 2004/0179513 | A1 | * | 9/2004 | Smith et al. | ................ 370/352 |

* cited by examiner

*Primary Examiner*—George Eng
*Assistant Examiner*—Marcos L Torres
(74) *Attorney, Agent, or Firm*—Wagner, Anderson & Bright, LLP; Roy L. Anderson

(57) ABSTRACT

A method for reducing the cost of demand control ventilation applications deploys wireless CO2 sensors inclusive of relative humidity and temperature throughout an indoor space without the need for wiring while utilizing the license-free 902-908 MHz ISM band by use of a Sequential Transmission Asynchronous Reception System ("STARS") that is software controlled.

17 Claims, 3 Drawing Sheets

The sequential transmission for a Sequential Transmission Asynchronous Reception System ("STARS") showing eight (8) broadcasting frequencies within a selected frequency sub-band

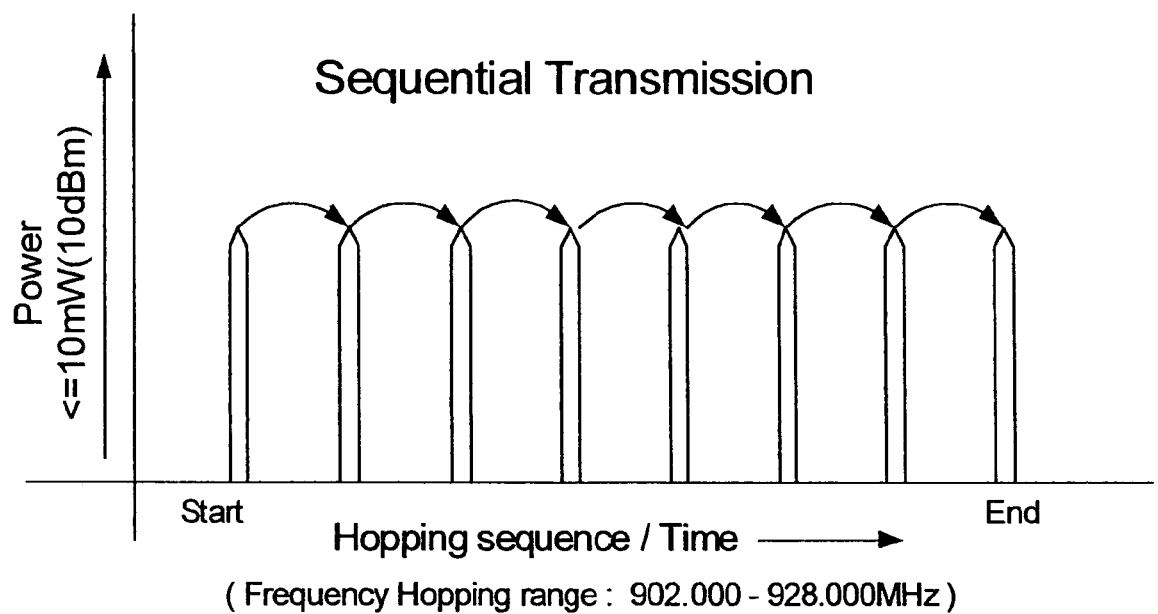
Figure 1. The sequential transmission for a Sequential Transmission Asynchronous Reception System ("STARS") showing eight (8) broadcasting frequencies within a selected frequency sub-band

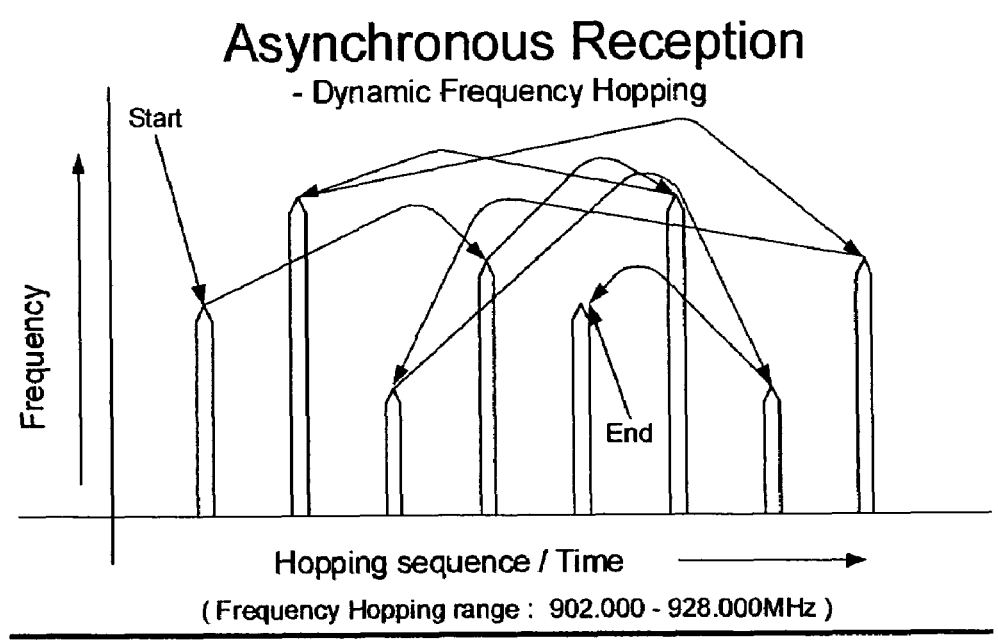
Figure 2. The mechanism for the dynamic frequency hopping in the asynchronous reception operation of the "STARS" wireless methodology

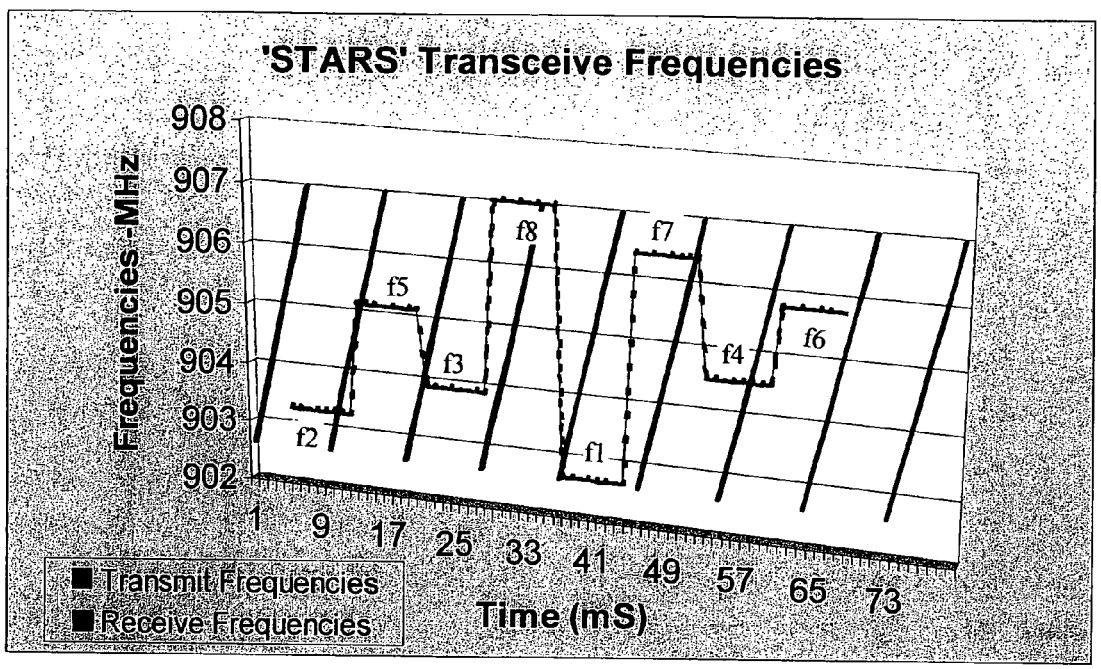
Figure 3. An example of an overall operation for the "STARS" wireless methodology. The frequency assignments are: f1 = 906.620 MHz, f2 = 903.250 MHz, f3 = 903.860 MHz, f4 = 904.500 MHz, f5 = 905.100 MHz, f6 = 905.750 MHz, f7 = 906.350 MHz and f8 = 907.500 MHz.

LOW-COST NOISE-IMMUNE WIRELESS METHODOLOGY FOR DEMAND CONTROL VENTILATION (DCV) APPLICATIONS

CROSS REFERENCE TO RELATED APPLICATIONS

The present application is a continuation-in part of U.S. application Ser. No. 60/470,041 filed on May 12, 2003 with the same title by the same inventors, the disclosure of which is specifically incorporated herein by reference.

FIELD OF THE INVENTION

The present invention is in the field of demand control ventilation and, more specifically, to a methodology for achieving ease of implementation, substantial system cost reduction and increased energy savings in this field.

BACKGROUND OF THE INVENTION

It is generally believed among energy experts that one of the last frontiers in saving energy in a global scale lies in the area of indoor space ventilation, particularly in commercial buildings. As a matter of fact, most experts predict that as much as ⅔ of the energy needed within the next 30 years will come from conservation technologies. Today, it is recognized that a vast amount of energy is being wasted to condition incoming air for mandated maximum occupancy ventilation according to ASHRAE standards, when in fact such spaces often have fewer than the maximum occupancy or no occupants at all. The difference in the level of ventilation actually needed versus the amount mandated by codes assuming full occupancy of the space represents the potential energy savings.

Carbon dioxide ($CO_2$) gas and water are known to be the end products of energy deriving metabolism of food in humans and many animals. An average human breathes out at the end of each breath (called the "end-tidal" portion) up to 5% of $CO_2$ or 50,000 ppm in concentration and the average $CO_2$ level in an exhaled breath hovers around 3,000-5,000 ppm or 0.30-0.50% of $CO_2$ by volume. The average outdoor $CO_2$ level is on the other hand typically only around 400-700 ppm. Consequently, $CO_2$ has been known for quite a while as an excellent surrogate parameter associated with the presence of humans. Thus when one or more persons are present in an enclosed space, the average concentration level of $CO_2$ in said space will increase steadily until outside air is brought into the space. The object of ventilating an enclosed space like many modern offices in high-rise buildings is to bring in fresh air from the outside that has a much lower $CO_2$ concentration in order to prevent the $CO_2$ level buildup from exceeding 1,000 ppm, which is mandated to be the ASHRAE standard. Until about a decade ago, a $CO_2$ analyzer capable of accurately measuring $CO_2$ concentration down to ppm levels cost several thousands of dollars. Today, a good $CO_2$ sensor with equal efficacy still costs upwards of several hundred dollars.

The method of using $CO_2$ concentration level to detect the presence of humans in an enclosed space, thereby bringing in just enough outside air to keep the $CO_2$ level under 1,000 ppm at all times (per ASHRAE standards), is commonly referred to as the Demand Control Ventilation (DCV) strategy. Depending upon what climate is prevalent in a particular geographical locale, such a strategy can lead to significant energy savings even in moderate climate zones. Although DCV strategies have been known for a number of years or ever since the low cost $CO_2$ sensors became available in the marketplace, such an energy-saving ventilation strategy has not been widely practiced in retrofitting old or existing commercial buildings because of one additional barrier. In order to exploit DCV, one has to install a number of $CO_2$ sensors in certain specific locations and in addition "wire" these sensors back to the Building Automation System (BAS) through one or more so-called Gateway controllers. For retrofitting old or existing commercial building, often times such installation and wiring costs far exceed those for the hardware ($CO_2$ sensors and Gateway controllers) and software (new or modified software for the BAS). Consequently, on the average, it would require at least three or more years to recover, through annual energy savings, the initial investment in implementing the DCV strategy. Thus it becomes apparent that in order for existing commercial building owners or operators to buy into the use of DCV to save energy, the overall outlay for DCV systems, particularly the installation and wiring part, needs be drastically reduced.

As alluded to above, it is quite apparent that without a DCV strategy, over-ventilation of a space would lead to unnecessary energy expenditures. Even more importantly, in certain specific locations such as the southern states in the U.S., particularly in the state of Florida, where the climate is invariably hot and humid for a good portion of the year, indiscriminant over-ventilation could lead to another often ignored peril that can drastically affect the indoor air quality (IAQ) of a space. That is because moisture-laden air, if not properly conditioned to remove its water content, can lead to the buildup of molds over time in inaccessible areas of a building without ever being noticed until a serious IAQ problem surfaces. In recent years, many building IAQ problems have been attributed to, to the surprise of many industry experts, the presence of molds in inaccessible areas of the building such as air ducts, wall partition spaces, basements etc. because of excessive moisture in the air. The principal culprit of molds buildup has now been identified as the over-ventilation and inadequate conditioning of moisture-laden outside air which has to be brought in for meeting the 20 cu. ft. per occupant per minute building code standard. It is therefore prudent that in addition to the $CO_2$ sensor, sensors for monitoring Relative Humidity (RH) and temperature (T) should also be included in the deployment of DCV strategy to save energy for existing commercial buildings while at the same time safeguarding the buildup of molds in inaccessible areas and not compromising the maintenance of the overall good IAQ.

SUMMARY OF THE INVENTION

The present invention is generally directed to a method for sequential transmission and asynchronous reception of data packets from multiple sensors to a Gateway controller in a Demand Control Ventilation system. Each sensor in the system transmits its own data packet sequentially for a preselected transmission period at a preselected number of frequencies within a preselected frequency band by use of a narrow band Frequency Shift Key ("FSK") system. The Gateway controller is tuned to receive at each of the preselected number of frequencies in the preselected frequency band in an asynchronous manner so that the Gateway controller is tuned to a particular frequency within the preselected number of frequencies for a reception period that is from approximately one-half to approximately 100% of a total transmission period required to complete transmission of the data packet over each of the preselected number of frequencies. The transmission and receiving continue until the Gateway controller receives a data packet from each of the sensors in the system.

In a first, separate group of aspects of the present invention, the transmission of the data packet by each sensor over the preselected number of frequencies is repeated either a preselected number of times or until the Gateway controller has received a data packet from each sensor. Alternatively, the transmission can continue until the sensor receives a confirmation signal from the Gateway controller once it has received the data packet. The confirmation signal In other, separate aspects of the present invention, the data packets can include information concerning carbon dioxide ("CO2") concentration, humidity, temperature, sensor identification and battery status; the preselected frequency band is approximately 902-928 MHZ; and the preselected transmission period is between approximately 40 to 100 msec.

In still other, separate aspects of the present invention, the reception period is greater than the total transmission period for a sensor to transmit its data packet over the preselected number of frequencies.

In yet still other, separate aspects of the present invention, the order in which the data packet is transmitted over the preselected number of frequencies is typically asynchronous and it can vary between different transmissions or be varied according to an algorithm. Also, the different sensors can transmit data packets simultaneously over different sequences of the preselected number of frequencies.

Accordingly, it is a primary object of the present invention to provide a novel wireless methodology called "STARS" to reduce the system installation costs for implementing demand control ventilation (DCV) strategy in old or existing commercial buildings.

This and further objects and advantages will be apparent to those skilled in the art in connection with the drawings and the detailed description of the preferred embodiment set forth below.

BRIEF DESCRIPTION OF THE DRAWINGS

FIG. 1 illustrates sequential transmission for a Sequential Transmission Asynchronous Reception System ("STARS") showing eight (8) broadcasting frequencies within a selected frequency band.

FIG. 2 illustrates the mechanism for the dynamic frequency hopping in the asynchronous reception operation of the "STARS" wireless methodology.

FIG. 3 illustrates the example of an overall operation for the "STARS" wireless methodology. The frequency assignments are: f1=906.620 MHz, f2=903.250 MHz, f3=903.860 MHz, f4=904.500 MHz, f5=905.100 MHz, f6=905.750 MHz, f7=906.350 MHz and f8=907.500 MHz.

DETAILED DESCRIPTION OF THE PREFERRED EMBODIMENT

A preferred embodiment of the present invention deploys wireless CO2 sensors inclusive of relative humidity and temperature throughout an indoor space without the need for wiring while utilizing the license-free 902-928 MHz radio spectrum for use by Industry, Scientific and Medical (ISM) entities. In particular, the current invention uses a Sequential Transmission Asynchronous Reception System ("STARS") technique that is software controlled for achieving a low-cost and substantially noise-immune wireless methodology for Demand Control Ventilation (DCV) applications.

One of the main reasons why DCV strategy has not been widely and successfully applied in the past to save energy in the management of old or existing commercial buildings is the high cost of wiring required for the installation of CO2 sensors throughout indoor spaces. The novel idea of deploying wireless CO2 sensors inclusive of Relative Humidity (RH) and temperature (T), the so-called Tri-sensors, thus eliminating the need for wiring, was advanced only a few years ago in order to alleviate this high cost barrier for the installation of DCV systems. However, unlike many wireless systems which communicate across public bands and are dedicated for use to appliances and home control systems with limited bandwidth (<10 Kbps), the wireless approach for a successful deployment of DCV sensors requires a much higher performance standard. First and foremost is its noise immunity capability since the public bands are crowded with interference. This is particularly the case for the license free 900 MHz ISM band and for communication within commercial buildings where this public band is heavily utilized during regular office hours. Second, such a wireless approach should afford 100% software control so that future system maintenance and/or enhancement do not require the change or addition of hardware. Third, such a system should have at least 50 Kbps bandwidth in order that intra system data transfer is viable and dependable. Fourth, the system should have a robust two-way communication capability and automatic repeater configurations in order to provide efficient and reliable transmissions in difficult situations such as the presence of concrete walls or elevator shafts in the middle of a space. Fifth, the system should also possess a variable frame structure for network protocol handling thereby assuring its interoperability with other control and intelligent wiring protocols. Last but not least, the system should afford the lowest cost per node in order that it can meet the stringent return on investment (ROI) expectation for DCV-deployed commercial buildings.

A preferred embodiment of the present invention utilizes the license-free 902-928 MHz ISM public radio spectrum in a novel low-cost and noise immune wireless methodology specially advanced for DCV application in old or existing commercial buildings. Its operation is 100% software-controlled. Unlike other broadband high performance wireless systems, particularly those that operate in the 2.4 GHz range, which require custom, complex and expensive parts in order for them to work, the current system called Sequential Transmission Asynchronous Reception System ("STARS") uses only off-the-shelf components for its operation, thereby achieving the lowest possible cost for its implementation and construction.

As the name "STARS" implies, the system sequentially transmits a data packet at a preselected number of frequencies within a specific preselected frequency band at the same outputs power as depicted in FIG. 1. The 902-928 MHz ISM band can be divided conveniently into five (5) sub-bands each having ~5 MHz bandwidth. Thus the specific frequency band comprising eight (8) individual frequencies as illustrated in FIG. 1 can be any one of the 5 sub-bands within the 902-928 MHz ISM band. The choice to broadcast the same data packet in any number of frequencies, e.g. eight (8) as shown in FIG. 1, is arbitrary but is limited by the extent or width of the sub-band defined and the mandatory modulation bandwidth. Since "STARS" is a narrow band Frequency Shift Key (FSK) system with a bandwidth of +/−50 KHz (for a "1" and "0" modulation), the frequency spacing of the carrier frequencies within a sub-band can be anywhere from 100 KHz to 1.0 MHz depending upon a particular implementation topology, with 100 KHz being the minimum separation. Thus the maximum number of frequencies selectable for broadcasting the same data packet when 5 sub-bands are defined within the 902-928 MHz ISM band is 50.

Since "STARS" can operate in essence over the entire ISM band, it can tolerate a significant amount of in-band (i.e. within the ISM band) interference provided that such interference affects only part and not all of the ISM radio spectrum. However, the speed and capacity of the "STARS" system degrades in proportion to the number of lost transmission channels or broadcasting frequencies used. For example, if 20% of the deployed frequencies are rendered unusable due to interference, the "STARS" system can still operate with 80% efficiency and deploy 80% of its usable frequencies. The fact that "STARS" is a narrow-band FSK system, the broadcasting frequency remains unchanged during the transmission of a data packet. Because of this limitation, no digital processing can be used to optimize or enhance system parameters during such a period leading to a lack of processing gain and a somewhat less power efficient operation. Notwithstanding, "STARS" is more tolerant of interference that is present outside of its operation frequencies when compared with much more expensive broadband spread spectrum systems.

As the name "STARS" implies, synchronization is not required during reception and the reception period is designed to cover the whole range of the transmission frequency spectrum within the 902-928 MHz ISM band as shown in FIG. 2. In FIG. 2, each of vertical bars represents a frequency band within the 902-928 MHz range selected by "STARS" for reception and the hopping sequence in time for this reception band follows no particular order and is therefore typically random or asynchronous. It is important to point out that since the reception period for a particular frequency covers the whole range of the transmission spectrum (see FIG. 1), the content of the data packet operating under "STARS" must therefore be rather small by design (see example below). It is possible that a particular reception period might not receive the data packet. However, even if a data packet cannot be completely received within the current transmission frequency hop, hence there is essentially no reception, the next hop for re-transmission is only a very short time away (equal to the total transmission time for all 8 frequencies or ~40 ms, see example to follow) and complete reception will then take place.

For example, assuming that there is 32 bytes or 256 bits in each data packet to be transmitted at a rate of 75 Kbps (or 13.3 µs per bit), the total time it takes to transmit a data packet of 256 bits at one particular selected frequency is only 3.41 ms. Assuming that there is 8 frequencies per band (see FIG. 1), and the transmission per data packet per frequency is ~5.0 ms including 1.6 msec frequency changing/hopping time, the total period for all 8 frequencies transmission is ~40 ms which includes the frequency switching period. Thus the total data packet transmission time in the present "STARS" system is variable dependent upon the size of the data packet to be transmitted and the number of allowable transmission frequencies selected. Since the operation of the "STARS" system is 100% software controlled, the number of selected transmission frequency and hence the total transmission time can be easily time-programmed. If the same information is also synchronously programmed into the reception system of "STARS" (see below), the resultant data transmission mechanism is practically stealth and causes minimal interference to other broadcasting systems since the dwell time at a particular transmission frequency is relatively short (typically <4 msec.).

Completing the implication of the name "STARS", the reception frequency hopping is in a typically random or asynchronous sequence as illustrated in FIG. 2. The "start" and "end" times can be virtually anywhere within the 902-928 MHz range. This novel typically asynchronous reception approach tactically avoids interfering signals by not spending a lot of time in any one specific reception frequency. The present "STARS" methodology prescribes the length of the reception time to range from one-half to 100% of the period required for all transmission frequencies to broadcast the data. Furthermore, even if interfering signals exist in one or more of the hopping reception frequency channels, the interference encountered by the transmitted data packet is minimal due to the small amount of time "STARS" spends on transmitting at any one particular frequency (<4 msec.).

The overall operation for the current novel "STARS" methodology is illustrated in FIG. 3. The reception frequencies, represented by short horizontal line segments labeled "f2", "f5", "f3" etc., hop asynchronously in time with no order in the frequency domain perceived outside of the system while the transmission frequencies, represented by the multiple slanted vertical lines along the time axis, are being broadcast in an orderly sequential manner within the series of preselected frequencies. As illustrated in FIG. 3, the system monitors each of the eight broadcast frequencies for at least half to almost the entire transmission period for the number of frequencies selected. Thus the total time devoted by the system to reception is also a variable and dependent upon the size of the data packet to be sent and also the total number of transmission frequencies selected. The "hit" areas are where the vertical and horizontal lines cross indicative of the fact that they hop into the same frequency thereby enabling the data packet reception to take place. Note that not all the reception frequency periods are "hit". Some of them may have to wait for the next "hit" but the maximum time delay between "hits" is less than twice the total transmission time for all the 8 broadcast frequencies to take place. In the example illustrated above, this equates to merely ~80 ms.

Although the preferred embodiment is described as using a typically random or asynchronous hopping between transmission frequencies, each sensor must transmit its data packet within a string of the preselected number of frequencies selected within the preselected frequency band. Thus, assuming again that eight broadcast frequencies are being used in our example, there are $2^8$ or 256 combinations by which the eight frequencies can be transmitted in series, and the particular string used for transmission need not be repeated for the next transmission of the string, which create the appearance of randomness to an observer outside of the system. The manner in which the string is selected or varied is not of particular significance and can be varied by any number of suitable means, such as one or more algorithms, which would be readily apparent to a person of ordinary skill in the art with the aid of the present disclosure.

Now that the overall concept of the "STARS" system has been described, it must still be implemented within a given system which includes a Gateway controller and multiple sensors. In order for the Gateway controller to recognize a data packet as coming from a given sensor, the sensor must also transmit sensor identification with its data packet. Once the Gateway controller receives a data packet from a given sensor, and receipt of the data packet is confirmed, it is especially preferred that the Gateway controller transmit a confirmation signal to that sensor telling it to either cease transmission or to terminate transmission of its data at the completion of its current string of transmissions to terminate data transmission during a given data transmission period. Alternatively, and depending upon the number of sensors contained within the system, the Gateway controller can transmit a group of confirmation signals to multiple sensors, or simply use a single confirmation signal to terminate all sensors simultaneously. Also, each sensor within the overall system can have its own sequence for transmitting its data packet within the string of the preselected number of frequencies, or even its own algorithm for selecting which string is transmitted at any given point in time.

There are several different ways to coordinate the timing of transmission of data between multiple sensors and the Gateway controller for a given data transmission period. A simple way is to have a synchronized clock and for all of the sensors to transmit simultaneously at a preselected interval such as every fifteen minutes. The Gateway controller can always stay "on" in the reception mode, or it can turn "on" close to the time of the next transmission. Or, alternatively, the Gateway controller could send a turn transmission "on" signal to all sensors, or a subset of the sensors, after which the sensors would either begin transmission or begin transmission in accordance with preselected conditions. While a turn "on" signal adds complexity, it also adds flexibility, since the turn "on" time could also be varied to achieve greater "randomness." The goal of such "randomness" is to prevent noise from blocking the system from functioning; however, such "randomness" also makes it harder to intentionally interfere with proper functioning of the system.

Thus, there has been described a Sequential Transmission Asynchronous Reception System ("STARS") wireless data transmission methodology, both as to organization and method of operation as preferred embodiments of the present invention. While the invention has been described herein with reference to certain preferred embodiments, those embodiments have been presented by way of example only, and not to limit the scope of the invention. Additional embodiments thereof will be obvious to those skilled in the art having the benefit of this detailed description. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A method for sequential transmission and asynchronous reception for use in transmitting data packets from a plurality of sensors in a demand control ventilation system to a Gateway Controller, each sensor transmitting its own data packet, comprising:
   (1) sequentially transmitting a data packet from each of the plurality of sensors for a preselected transmission period at a preselected number of frequencies within a preselected frequency band by use of a narrow band Frequency Shift Key ("FSK") system;
   (2) tuning the Gateway controller to receive at each of the preselected number of frequencies in the preselected frequency band in an asynchronous manner wherein the Gateway controller is tuned to a particular frequency within the preselected number of frequencies for a reception period that is from approximately one-half to approximately 100% of a total transmission period required to complete step (1); and
   (3) repeating steps (1) and (2) until the Gateway controller receives the first data packet from each of the plurality of sensors for a chosen interval;
   (4) repeating steps (1) through (3) a preselected number of times for a chosen time period so that the Gateway controller receives a preselected number of data packets from the plurality of sensors;
   wherein step (1) is repeated a preselected number of times for each of the plurality of sensors; and
   wherein the data packets include information concerning carbon dioxide ("CO2") concentration, humidity, temperature and a sensor identification.

2. The method of claim 1, wherein the preselected frequency band is approximately 902-928 MHZ.

3. The method of claim 1, wherein the reception period is greater than the total transmission period.

4. The method of claim 1, wherein the preselected transmission period is between approximately 40 to 100 msec.

5. The method of claim 1, wherein the order in which the data packet is transmitted over the preselected number of frequencies is typically asynchronous.

6. The method of claim 5, wherein the order in which the data packet is transmitted over the preselected number of frequencies varies between steps (1) and (3).

7. The method of claim 5, wherein the order in which the data packet is transmitted over the preselected number of frequencies varies between some of the plurality of sensors.

8. The method of claim 5, wherein the order in which the data packet is transmitted over the preselected number of frequencies is chosen according to a preselected algorithm.

9. The method of claim 1, wherein the data packets include information about battery status.

10. A method for sequential transmission and asynchronous reception for use in transmitting data packets from a plurality of sensors in a demand control ventilation system to a Gateway controller, each sensor transmitting its own data packet, comprising:
   (1) sequentially transmitting a data packet from each of the plurality of sensors for a preselected transmission period at a preselected number of frequencies within a preselected frequency band by use of a narrow band Frequency Shift Key ("FSK") system;
   (2) tuning the Gateway controller to receive at each of the preselected number of frequencies in the preselected frequency band in an asynchronous manner wherein the Gateway controller is tuned to a particular frequency within the preselected number of frequencies for a reception period that is from approximately one-half to approximately 100% of a total transmission period required to complete step (1);
   (3) repeating step (1) for each of the plurality of sensors until a confirmation signal from the Gateway controller is received by said sensor;
   (4) sending a confirmation signal from the Gateway controller to each of the plurality of sensors from which the Gateway controller has received the data packet; and
   (5) repeating steps (1) through (4) until the Gateway controller receives the first data packet from each of the plurality of sensors for a chosen interval;
   wherein the data packets include information concerning carbon dioxide ("CO2") concentration, humidity, temperature and a sensor identification.

11. The method of claim 10, wherein the preselected frequency band is approximately 902-928 MHZ.

12. The method of claim 10, wherein the reception period is greater than the total transmission period.

13. The method of claim 10, wherein the order in which the data packet is transmitted over the preselected number of frequencies is typically asynchronous.

14. The method of claim 10, wherein the order in which the data packet is transmitted over the preselected number of frequencies can vary between steps (1) and (3).

15. The method of claim 10, wherein the order in which the data packet is transmitted over the preselected number of frequencies varies between some of the plurality of sensors.

16. The method of claim 15, wherein the order in which the data packet is transmitted over the preselected number of frequencies is chosen according to a preselected algorithm.

17. The method of claim 10, wherein the data packets include information about battery status.

* * * * *